Nov. 24, 1942.   N. J. POUX   2,302,912
METHOD OF MAKING SLIDE FASTENERS
Original Filed Oct. 18, 1937
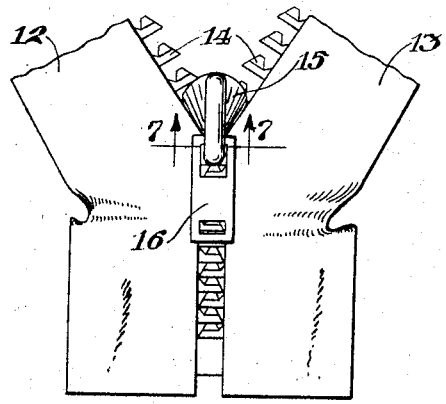
Fig. 1
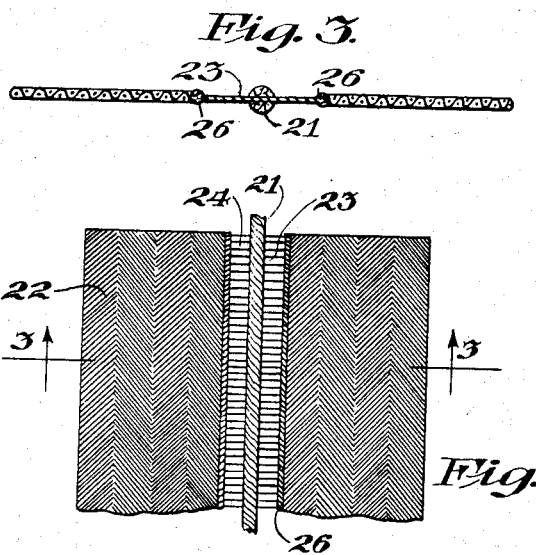
Fig. 3.
Fig. 2.
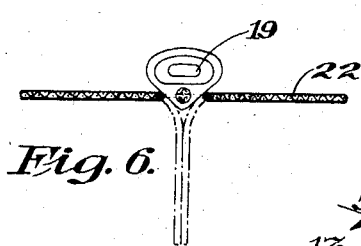
Fig. 6.
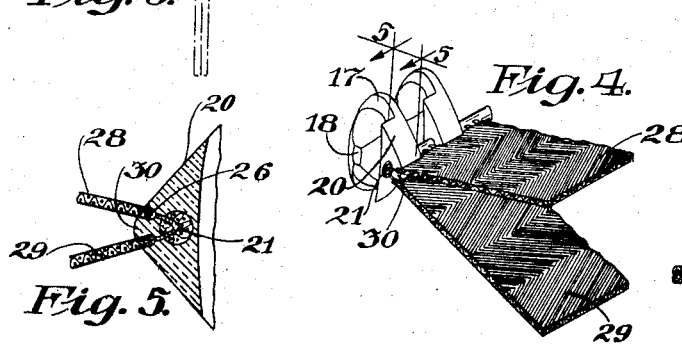
Fig. 4.
Fig. 5.
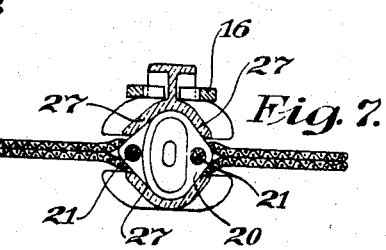
Fig. 7.
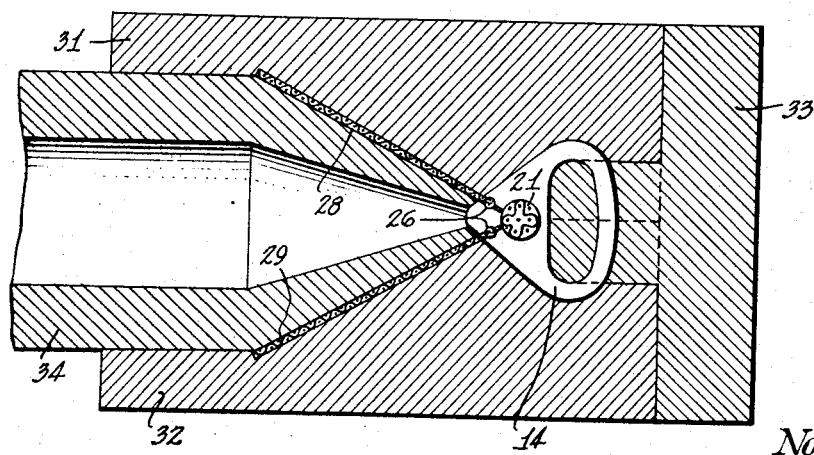
Fig. 8.
INVENTOR.
Noel J. Poux
BY R. S. Kelley.
ATTORNEY.

Patented Nov. 24, 1942

2,302,912

UNITED STATES PATENT OFFICE 2,302,912

METHOD OF MAKING SLIDE FASTENERS

Noel J. Poux, Meadville, Pa., assignor to Talon, Inc., a corporation of Pennsylvania Original application October 18, 1937, Serial No. 169,565. Divided and this application June 24, 1940, Serial No. 342,090

2 Claims. (Cl. 18—59)

This invention relates to slide fastener manufacture, and is a division of my copending application Serial No. 169,565, filed October 18, 1937, for Slide fasteners, which matured into Patent 2,225,286, dated December 17, 1940.

Heretofore in the design of interlocking elements especially of the non-metallic type, difficulty has been experienced in making the elements of a small size to provide a neat application in practice, and at the same time, to have a structure in which the elements are securely held on the stringers.

My above-identified application discloses an improved fastener construction in which the elements or at least the visible portions thereof, have the minimum width and, at the same time, have a secure and strong connection between the elements and the fabric stringers. The general object of this invention is to provide an improved method of making such fasteners.

More specifically it is an object of my invention to provide an improved method of constructing stringers involving the attachment of interlocking elements to a tape in such a way as to make it convenient to mold the fastener elements directly on them.

These and other objects and advantages of the invention will appear from the following description taken in conjunction with the accompanying drawing which form a part thereof, and will be pointed out in the appended claims.

Preferred embodiments of the present invention will be hereinafter described with reference to the accompanying drawing given merely by way of example, and in which:

Fig. 1 is a plan view of a fastener manufactured in accordance with my invention;

Fig. 2 shows a preferred form of fabric stringer;

Fig. 3 is a section on the line 3—3 of Fig. 2;

Fig. 4 is a perspective detail view of a fastener manufactured in accordance with my invention;

Fig. 5 is a section on the line 5—5 of Fig. 4, and illustrates the method of molding said stringers and beads in the legs of the interlocking elements;

Fig. 6 is a cross-section showing one suitable arrangement of the stringer in the molding operation;

Fig. 7 is a section on the line 7—7 of Fig. 1;

Fig. 8 is a cross-section illustrating apparatus for attaching said stringers to said fastener elements.

My improved slide fastener as seen in Fig. 1 may be generally described as having two stringers 12 and 13 with fastener elements 14 extending from adjacent edges of the stringers, the visible portions of said elements being much narrower than the customary slide fastener design. A slider 15 which is correspondingly narrower, rides over the interlocking elements to engage or disengage them and is operated by a convenient pull tab 16. The bulk of each of the fastener elements comprises the interlocking or head portion 17, which has a projection 18 on one side and a correspondingly shaped recess 19 on the opposite side, which may be of any of the shapes now used in commercial fasteners. The manner of interlocking by mutual engagement of the projections on one side by the sockets on the opposite side is well understood and need not be further described.

Instead of the usual legs or attaching arms which extend in a parallel direction from the interlocking head over the edge of the tape, the sides of my improved fastener element slope abruptly toward the tape to provide inclined straight or rounded sides 20. They overlap the tape just slightly more than enough to cover the bead 21 which may be relatively smaller than beads at present used on slide fasteners.

The stringer shown in Figs. 2 and 3 comprises a fabric tape 22 with an intermediate section 23 having the longitudinal threads omitted so as to provide spaces 24 between the cross-wise extending threads. The bead 21 extends through this section and is attached to cross-wise extending threads and is preferably woven integral therewith. Also threads 26 slightly larger than the longitudinal threads are located along the sides of the section which has the longitudinal threads omitted. As shown in Fig. 5 the molded element preferably extends far enough to cover the threads 26. In some cases this may be a more desirable construction than that shown in Fig. 6 for the reason that the longitudinal threads 26 embedded in the molded elements will tend to prevent buckling or wrinkling of the tape. The slider, as shown in Fig. 7, is of such size and shape as to fit over the heads of the interlocking elements and instead of the usual flat wing with side flanges, the wings are almost V-shape in cross-section with inclined sides 27 adapted to bear against the inclined surfaces 20 of the fastener elements.

The fastener elements consist of molded material molded directly in place on the stringers, each of the stringers in the fastener consisting of two thicknesses of material 28, 29, which are folded with the bead 21 located at the fold line but adjacent the fold the two thicknesses are somewhat spaced apart to provide a space 30 which is occupied by the molded material of the element, that is, the molded material extends into that space.

The bead 21 is thus surrounded by and embedded in the molded material as are also those cross-wise threads which extend through the fastener members. The two thicknesses of material may, if desired, be sewn or cemented together adjacent the fastener elements or they may be left apart in accordance with the particular manner of applying the fastener in an article to be fastened.

In molding the fastener members, the tape 22 may be arranged in some such manner as shown in Figs. 6 and 8, with the mold parts 31, 32 and 33 on one side of the tape and the projecting nozzle 34 for the moldable material on the other side of the tape, it being understood that the material is forced through the spaces between the cross-threads in that section of the tape where there are no longitudinal threads and directly into the mold cavities on the other side of the tape. The design of the mold parts 31, 32 and 33 is substantially the same as described in United States Letters Patent No. 2,074,368 granted to George H. C. Corner, March 23, 1937.

While I have shown and described some embodiments which my invention may assume in practice, it will be understood that variations may be made within the scope of the invention, for example, in some cases, the advantageous features of my invention may be realized in the molding or die-casting of metallic elements to a stringer. Furthermore, many of the advantages of the invention may be secured by using a single thickness tape having some of the longitudinal threads omitted along the beaded edge so that the material of the molded element can flow around these threads in the manner as illustrated.

Having thus fully described my invention, what I claim as new and desire to secure by Letters Patent is:

1. The method of making slide fasteners of the class described, which comprises arranging a tape having apertures therein between a nozzle on one side and mold parts on the other side, which mold parts have cavities therein adapted to form fastener members, and introducing by means of said nozzle moldable material into said mold cavities by forcing the moldable material through the apertures in said tape.

2. The method of making slide fasteners of the class described, which comprises arranging a tape having a section where there are no longitudinal threads between a nozzle on one side and mold parts on the other side, which mold parts have cavities therein adapted to form fastener members, and introducing by means of said nozzle moldable material into said mold cavities by forcing the moldable material through the spaces between the cross threads in that section of the tape where there are no longitudinal threads and directly into the mold cavities on the other side of the tape.

NOEL J. POUX.